(12) United States Patent
Mercat

(10) Patent No.: US 6,402,256 B1
(45) Date of Patent: Jun. 11, 2002

(54) BICYCLE RIM AND WHEEL HAVING SUCH A RIM

(75) Inventor: Jean-Pierre Mercat, Chatillon sur Chalaronne (FR)

(73) Assignee: Mavic S.A., Saint Trivier sur Moignans (FR)

( * ) Notice: Subject to any disclaimer, the term of this patent is extended or adjusted under 35 U.S.C. 154(b) by 0 days.

(21) Appl. No.: 09/654,907

(22) Filed: Sep. 5, 2000

(30) Foreign Application Priority Data

Sep. 17, 1999 (FR) .............................. 99 11808

(51) Int. Cl.⁷ .............................................. B60B 21/06
(52) U.S. Cl. ................ 301/95.104; 301/58; 301/95.108
(58) Field of Search ....................... 301/55, 58, 95.101, 301/95.104, 95.106, 95.107, 95.108

(56) References Cited

U.S. PATENT DOCUMENTS

| | | | |
|---|---|---|---|
| 395,523 A | * | 1/1889 | Taylor |
| 446,189 A | * | 2/1891 | Overman |
| 452,649 A | * | 5/1891 | Powell |
| 521,385 A | * | 6/1894 | Mosely |
| 1,484,844 A | * | 2/1924 | Olle |
| 4,793,659 A | * | 12/1988 | Oleff et al. |
| 5,499,864 A | * | 3/1996 | Klein et al. |
| 5,651,591 A | | 7/1997 | Mercat et al. ................ 301/95 |

FOREIGN PATENT DOCUMENTS

| | | |
|---|---|---|
| EP | 0714791 | 6/1996 |
| EP | 0714792 | 6/1996 |
| EP | 0715001 | 6/1996 |
| EP | 0818328 | 1/1998 |
| EP | 0893280 | 1/1999 |
| TW | 313981 | 8/1997 |
| WO | WO 93/09963 | 5/1993 |

* cited by examiner

Primary Examiner—Russell D. Stormer
(74) Attorney, Agent, or Firm—Greenblum & Bernstein, P.L.C.

(57) ABSTRACT

A bicycle rim including an annular shaped element whose cross-section includes a box shape demarcated by an upper bridge and a lower portion having a lower bridge and side walls, the lower bridge or the side walls having holes distributed evenly and provided for the connection of the spokes, the holes and their immediate vicinity defining boring zones. The thickness of the walls constituted by the lower bridge and the side walls has a nominal value in the boring zones and a lower value than the nominal value in the intermediate zones located between two adjacent boring zones, and the thickness of this wall varies progressively from the nominal value to the lower value to the nominal value.

22 Claims, 3 Drawing Sheets

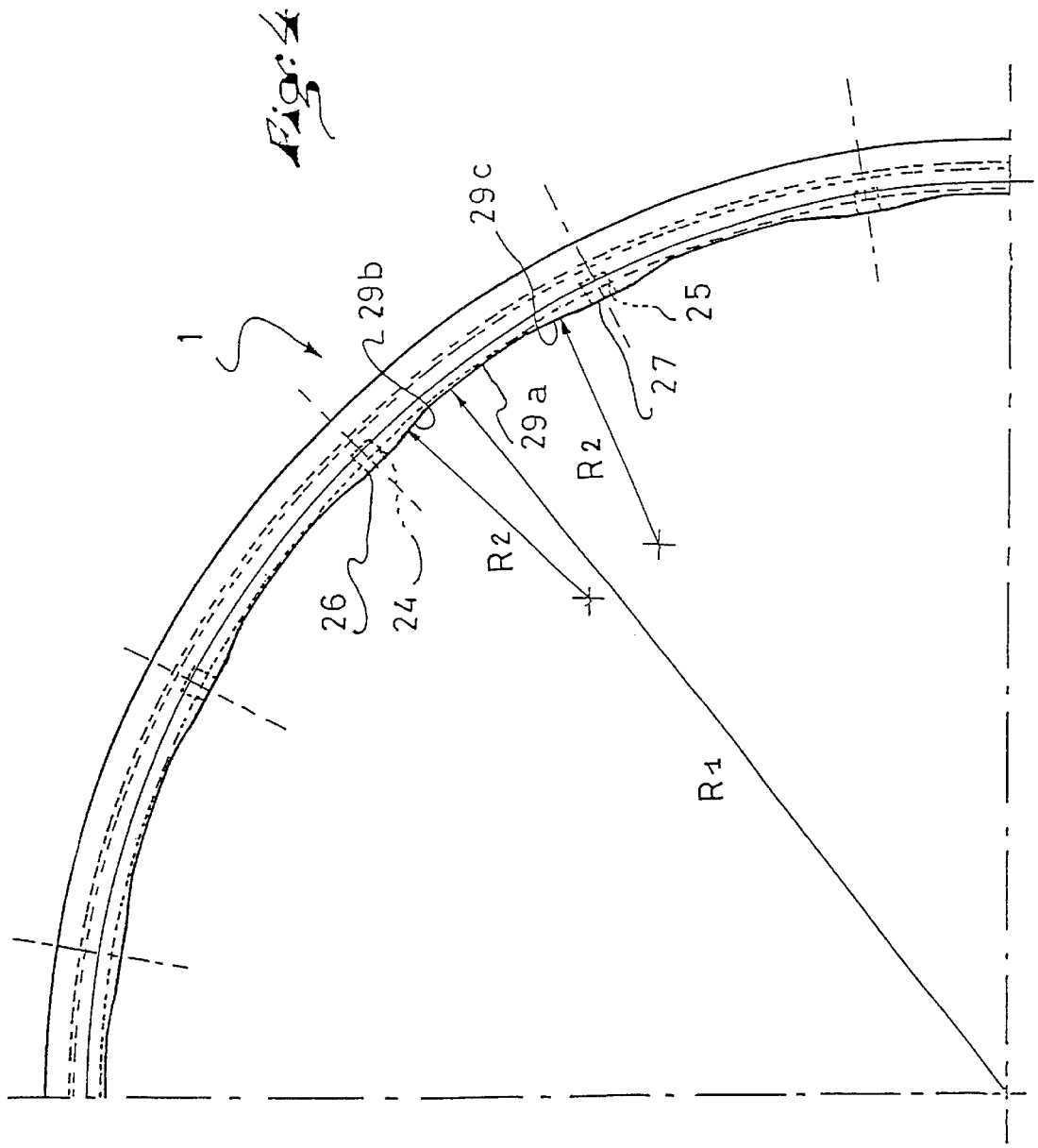

BICYCLE RIM AND WHEEL HAVING SUCH A RIM

BACKGROUND OF THE INVENTION

1. Field of the Invention

The present invention relates to a bicycle rim and a wheel having such a rim.

2. Description of Background and Relevant Information

In a known manner, a bicycle wheel includes a central hub, a peripheral rim and connecting spokes between the rim and the hub. The spokes are distributed in two sets, and their number can vary from 6 to 18, or even more, in each of the sets, depending on the degree of stiffness desired for the wheel.

The rim is made from a bent profile element that has the shape of a casing, i.e., that is box-shaped in cross-section, with an upper bridge, a lower bridge, and two side connecting walls. For certain profiles, the lower bridge is sometimes very narrow and merges with the side walls. For certain rims, the two bridges are joined by one or several intermediate ribs.

There are two main construction methods of connecting the spokes to the rims. Either the means for retaining the spoke is supported on the upper bridge of the rim; in this case, it is generally double eyelets that retain the spoke nipple and take support on both the upper bridge and lower bridge of the rim, or the spoke is only connected to the lower portion of the casing, i.e., most often to the lower bridge with a single eyelet, or even without any eyelet. For certain rims having a tapered profile, the spokes may be connected to the side walls of the rim.

It can be interesting to connect the spokes only in the lower portion of the casing, especially in order to obtain a tubeless wheel. To this end, blind holes that do not extend through the upper bridge can be made in the lower bridge, for example. Such a rim is disclosed in application WO93/09963, or patent application EP 818 328, more particularly the embodiment of FIG. 13. In both cases, the spokes are screwed by means of an end-piece in the threaded holes of the lower bridge of the rim. Since the upper bridge does not have any hole, except that provided for the valve, such a rim is perfectly adapted for a tubeless wheel.

The invention relates more particularly to this category of rims.

The important properties of a rim are its static strength, its dynamic fatigue strength and its weight, which determines its inertia.

For a wheel, the important properties are the weight, the inertia, its strength and stiffness under front and lateral stress.

Recently, it has been sought to lighten the wheels by reducing the rim material mass in order to also reduce its inertia and the inertia of the wheel.

In this field, a first constraint is the wall minimum thickness that is imposed by the operation of drawing or extruding the profile element of the rim. Reasonably, it is indeed not possible to reduce this thickness below 0.8 millimeters.

However, certain rim profiles with an types of alloys can support wall thicknesses that are lower than the minimum thickness imposed by the drawing operation. Therefore, one has begun reducing the rim wall thickness after drawing, by chemical machining, for example, as is described in patent application BP 715 001, or EP 714 792.

With respect to connecting the spokes, these two documents recommend the use of double eyelets. These rims therefore belong to the first of the aforementioned categories. The double eyelets yield good results; however, their correct positioning is difficult to control due to the manufacturing tolerance of the section of the rim, which influences the distance between the two bridges, and to the manufacturing tolerance of the eyelet itself. The inflation can also influence the tightening which the eyelet axerts between the two bridges or the distribution of the forces between these two bridges. An incorrectly positioned, i.e., overly tightened, double eyelet can produce less satisfactory results than a single eyelet.

The reduction in the wall thickness essentially affects the lower bridge of the rim, for it is not subject to the stresses coming from the pressure in the tube, as well as to the stresses due to the impacts of the wheel. Therefore, it is logical to connect the spokes to the upper bridge of the rim in order to relieve the lower bridge of the stresses generated by the tension of the spokes.

The construction for the second category of rims to which the invention relates is different. Indeed, the tension of the spokes in this case is mainly sustained by the lower portion of the casing. The thickness of the lower bridge cannot be reduced in a uniform manner, as disclosed in EP 715 001, for example, without affecting the fatigue strength of the bridge. This document does provide the use of shields positioned in the vicinity of the holes so as to locally reinforce the thickness in these zones after the chemical attack. However, such a technique proves cumbersome to implement. Moreover, the reduction in thickness obtained is sharp, which does not resolve the problem of fatigue strength in a satisfactory manner.

SUMMARY OF THE INVENTION

An object of the invention is to propose a rim with a connection of the spokes in the lower portion of the casing, which has improved properties, i.e., whose weight is reduced by a machining of the wall, and whose fatigue strength is not significantly affected by the decrease in weight.

Another object of the invention is to provide a rim having an improved appearance, i.e, whose machined surfaces obtained in view of the reduction in weight form a support that makes it possible to produce a remarkable-aesthetic effect.

Yet another object of the invention is to provide a bicycle wheel whose spokes are connected to the lower portion of the casing and which has improved weight and inertia properties.

Other objects and advantages of the invention will become apparent from the description that follows.

The bicycle rim according to the invention has an annular shaped, or profile, element whose cross-section includes a casing demarcated by an upper bridge and a lower portion having a lower bridge and side walls, the lower bridge or the side walls having holes distributed evenly and provided for connecting the spokes, the holes and their immediate vicinity defining boring zones.

The thickness of at least one of the walls of the rim constituted by the lower bridge and the side walls has a nominal value in the boring zones and a lower value than the nominal value in the intermediate zones located between two boring zones, and in that the thickness of this wall varies progressively from the nominal value to the lower value to the nominal value.

The invention is based on the following finding. For a connection of the spokes to the lower bridge of the rim, the stresses in the lower bridge are substantial in the boring zones, but decrease rapidly as soon as one moves away from these zones. Thus, the wall thickness can be reduced between the different boring zones without affecting the fatigue strength of the rim significantly. The progressive variation in thickness furthermore ensures a homogenous distribution and scattering of these stresses.

BRIEF DESCRIPTION OF DRAWINGS

The invention will be better understood upon reading the following description, with reference to the annexed drawings that are an integral part thereof, and in which:

FIG. 4 is a side view of the rim of FIG. 2.

DETAILED DESCRIPTION OF THE INVENTION

Figure 1:
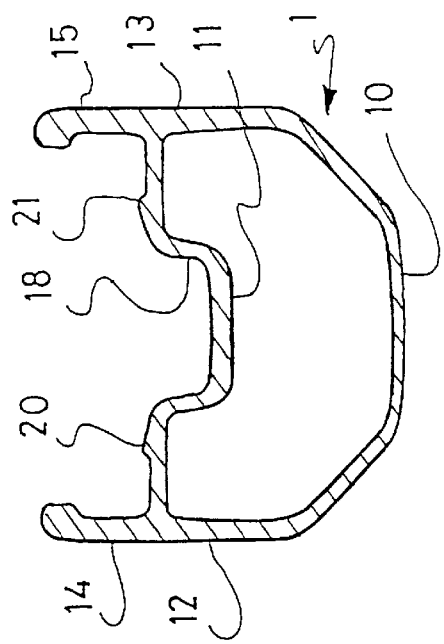
FIG. 1 is a cross-sectional view of a rim section according to a non-limiting embodiment of the invention.

FIG. 1 shows a cross-section of the section of a rim 1 according to a first embodiment of the invention. The rim shown is provided to equip a mountain bike. In a known fashion, the rim is made from a segment of a one-piece profile element made of an aluminum alloy or other bent section, the two ends of which are assembled by welding or by means of a sleeve. Conventionally, the profile element has a casing structure, i.e., a box shape, with an upper bridge 11 and a lower portion including the lower bridge 10 and side walls 12 and 13 which are extended upwardly by rim flanges 14 and 15. The rim flanges form, together with the upper bridge 11, an annular channel in which the tire is housed. The outer diameter of the rim is 572 millimeters.

According to a particularity of this embodiment, the upper bridge-does not have any holes except that provided for the valve. The rim is provided for a tubeless mounting. Preferably, to facilitate the mounting of the tire and its inflation, as is shown in FIG. 1, the upper bridge has a narrow and deep well 18. The well is further edged with two projecting edges 20 and 21. During the mounting of the tire, the sides of the tire are housed in the well and tend to expand toward the walls of the well, obtaining a relative imperviousness in his area. This enables the primary inflation of the tire which, in addition, improves the imperviousness between the tire and the rim as pressure in the tire increases. Beyond a predetermined pressure in the tire, the sides jump over the projecting edges 20 and 21 and lay flat against the rim flanges 14 and 15. This has already been described in the commonly owned published patent application EP 893 280.

Figure 2:
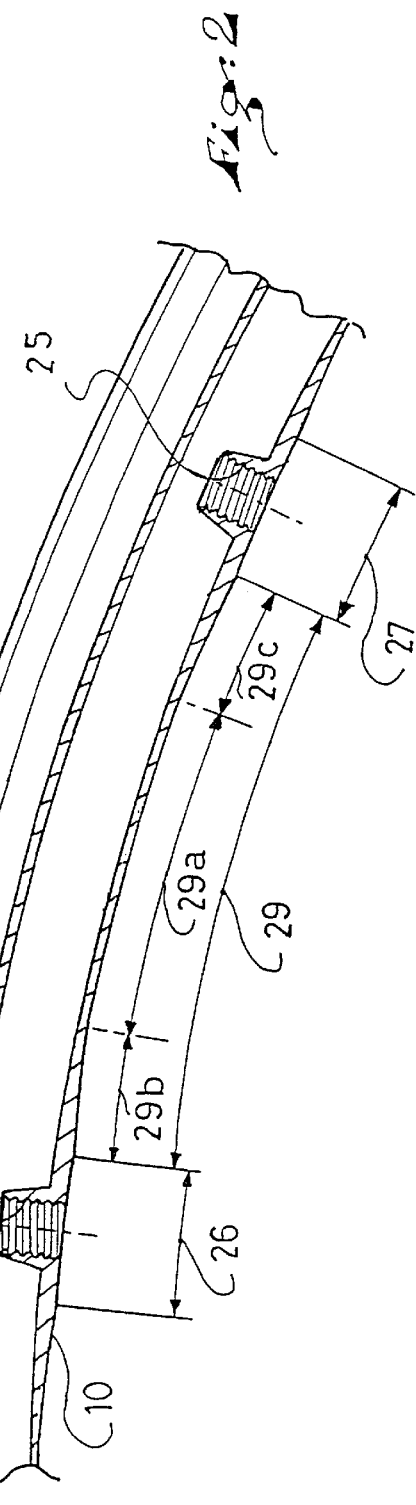
FIG. 2 is a longitudinal cross-sectional view of the rim of FIG. 1, in the area of a spoke hole.
Figure 3:
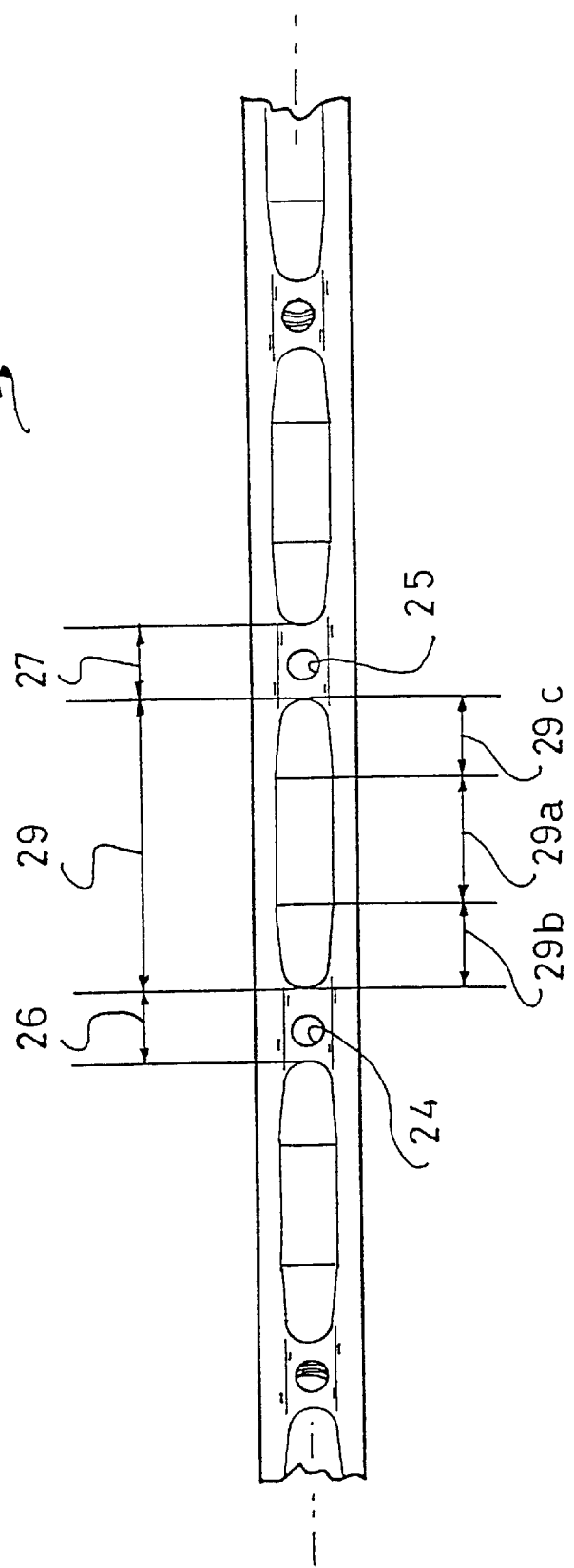
FIG. 3 shows the rim of FIG. 2 seen from within.

Another particularity of the rim shown in FIGS. 1–3 is also described in the aforementioned patent application. The lower bridge has holes for connecting the spokes, such as the holes 24 and 25. These holes are distributed in a uniform manner along the perimeter of the rim. They are in the form of a chimney-like structure formed by flow drilling toward the inside of the casing. The inside of the casing is threaded to enable the screwing of an end-piece for connecting the spoke The number of holes provided for connecting the spokes is not limiting. Conventionally, it can be comprised between 12 and 36 depending on the type of wheel.

According to the embodiment shown, the thickness of the lower bridge 10 is variable along the perimeter of this bridge. In the vicinity of the holes, the thickness of the lower bridge is equal to the nominal thickness of this wall, i.e., to the thickness of the wall produced by the die. These zones are referenced at 26 and 27 for the holes 24 and 25. As can be seen more easily in FIG. 3, these boring zones extend around the holes, and they extend in the direction of an adjacent hole along the perimeter of the rim.

In the embodiment shown, the holes have an inner diameter of 6 millimeters, and the boring zones 26 and 27 extend over 8 millimeters on each side of the boring axis, along the perimeter of the rim.

Between two zones of nominal thickness, the lower bridge has zones of reduced thickness. Thus, the figures show the zone 29 of reduced thickness located between the two boring zones 26 and 27. The reduction in thickness is progressive, i.e., the zone 29 has a median portion 29a of minimum thickness that is edged with two transitional zones 29b and 29c with the adjacent zones of nominal thickness.

In the embodiment shown, the nominal thickness of the lower bridge is of 1.7 millimeters. In the zones 29a, the thickness is reduced to 0.5 millimeters. The zone 29 has a median zone 29a machined with a radius R1 of 266.2 millimeters centered on the axis of revolution of the rim. The two transitional zones that edge the median zone are machined with a radius R2 of 100 millimeters and they are tangent to the median zone.

These values are provided for guidance only and are not limiting for the invention. In particular, the value of the minimum thickness could be different from 0.5 millimeters.

The machining is a mechanical machining performed on a numerical control milling machine or on a special machine. The milling cutter used is a formed milling cutter that provides the lower bridge with a slightly bulged shape in cross-section, i.e., in the plane of FIG. 1. The machining is repeated in each interval located between two holes. In the interval including the valve hole, it is possible to reduce the thickness of the bridge to an intermediate value comprised between the nominal value and the minimum value, for example, 1.1 millimeters, so as not to risk damaging the bridge or the valve in this zone during the mounting of the wheel.

As has been stated previously, the stresses resulting from the tension of the spokes are concentrated in zones of the lower bridge located in the vicinity of the connection holes. In these zones, the thickness of the bridge is equal to, or even greater than he wall thickness for a conventional rim. Having chimney-like holes provides an additional advantage. Indeed, this boring mode preserves the continuity of the lower bridge structure, so that no weakness zone is created in the periphery of the hole. The same is true for the upper bridge that does not have any hole, except the valve hole.

In the intervals between two successive holes, the concentration of the stresses in the lower bridge is low; it is therefore possible to reduce the wall thickness as has been described. The transitional zones ensure a homogenous distribution of the stresses between the zones of nominal thickness and the zones of reduced thickness.

The weight of the rim is reduced, as well as its inertia, without its static strength and dynamic fatigue strength being affected in a significant manner.

With respect to the rim finish, the rim usually undergoes an anodizing operation that protects its outer layer, and which makes it possible to harden and/or stain it, if necessary. In the present case, if the machining of the intervals is performed after a first anodizing operation, the machined zones are susceptible of receiving a second anodizing; conversely, the non-machined zones are not sensitive to this new treatment. By using appropriate products, it is therefore possible to anodize the machined zones with a different staining than that of the non-machined zones. This makes it possible to obtain a quite remarkable aesthetic effect. If the braking surfaces are also machined, they can be associated with this double staining effect. A multiple staining effect could also be obtained by performing repeated machining and anodizing sequences with different staining components.

It is to be understood that the invention is not limited to the particular details of the embodiment that has just been described.

Initially, based on the same idea that the stresses are concentrated in the vicinity of the holes, it would be possible to reduce the thickness of the side walk in the same manner in the intervals located between two successive holes. This could apply especially to the rims having a very tapered profile in cross-section, with a very narrow, even non-existent lower bridge. Such a rim is described, for example, in the commonly owned published patent application EP 714 791.

The invention generally applies to any rim profiles, including those equipped with reinforcement partitions within the casing.

Moreover, the invention is not limited to the rims whose holes are in the form of a chimney. It applies to any type of rim, in particular rims provided for road bikes, mountain bikes, to rims where the connection of the spokes is obtained by means of conventional single or double eyelets.

The instant application is based upon French patent application No. 99.11808, filed Sep. 17, 1999, the disclosure of which is hereby incorporated by reference thereto in its entirety, and the priority of which is hereby claimed under 35 U.S.C. §119.

What is claimed is:

1. A bicycle rim comprising:
an annular one-piece profile element having a box shape in cross section, said box shape being demarcated by an upper bridge and a lower portion having a lower bridge and side walls, the lower bridge or the side walls having holes distributed evenly and provided for connection of spokes, the holes and their immediate vicinity defining boring zones, wherein the thickness of at least one of the walls constituted by the lower bridge and the side walls has a nominal value in the boring zones and a lower value than the nominal value in the intermediate zones located between two adjacent boring zones, and wherein the thickness of said wall varies progressively from the nominal value to the lower value to the nominal value.

2. A bicycle rim according to claim 1, wherein the thickness of the wall is reduced in the intermediate zones by a mechanical machining operation.

3. A bicycle rim according to claim 1, wherein an intermediate zone includes a median zone of minimum thickness and transitional zones.

4. A bicycle rim according to claim 1, wherein the lower bridge has intermediate zones located between two adjacent boring zones whose thickness is reduced with respect to the boring zones.

5. A bicycle rim according to claim 4, wherein the minimum thickness of a median zone is of 0.5 mm.

6. A bicycle rim according to claim 4, wherein the transitional zones are machined with a radius of curvature of 100 millimeters, and wherein they each are tangent to a median zone and a boring zone.

7. A bicycle rim according to claim 1, wherein the intermediate zones have undergone a staining treatment different from the rest of the rim.

8. A bicycle rim according to claim 1, wherein the upper bridge does not have any hole except that provided for the valve.

9. A bicycle rim according to claim 1, wherein a plurality of chimneys project toward the inside of the box shape, and wherein the holes extend through respective ones of said chimneys.

10. A bicycle wheel comprising arm according to claim 1.

11. A bicycle rim according to claim 1, wherein said holes extend through said lower bridge.

12. A bicycle rim comprising:
an annular profile element having a box-shaped cross section demarcated by an upper bridge and a lower portion of said annular element, said lower portion comprising a lower bridge and side walls;

said lower portion further comprising holes spaced apart around said annular element, said holes being provided for connection of spokes;

said annular element further comprising boring zones defined by said holes and immediately adjacent portions of said lower portion of said annular element and intermediate zones extending between adjacent pairs of said boring zones;

said lower portion of said annular element having at least one wall constituted by said lower bridge and said side walls, said at least one wall having a thickness with a nominal value in said boring zones and a lower value than said nominal value in said intermediate zones, wherein said thickness of said at least one wall varies progressively from said nominal value to said lower value.

13. A bicycle rim according to claim 12, wherein said at least one wall is constituted by said lower bridge.

14. A bicycle rim according to claim 12, wherein said thickness of said at least one wall is reduced in the intermediate zones by having been mechanically machined to provide said thickness in said boring zones to project radially inwardly with respect to said thickness in said intermediate zones.

15. A bicycle rim according to claim 12, wherein each of said intermediate zones includes a median zone of minimum thickness and transitional zones on opposite sides of said median zone.

16. A bicycle rim according to claim 15, wherein said minimum thickness of a median zone is 0.5 mm.

17. A bicycle rim according to claim 15, wherein said transitional zones are machined with a radius of curvature of 100 millimeters, and wherein they each are tangent to a median zone and a boring zone.

18. A bicycle rim according to claim 12, wherein said intermediate zones are colored differently from a remainder of the rim.

19. A bicycle rim according to claim 12, wherein said upper bridge does not have any hole except that provided for a valve.

20. A bicycle rim according to claim 12, wherein said holes extend through respective chimneys oriented toward an inside of said box-shaped annular element.

21. A bicycle rim according to claim 12, wherein said holes extend through said lower bridge.

22. A bicycle wheel comprising a rim according to claim 11.

* * * * *